Aug. 28, 1956  R. R. CROOKSTON  2,760,439
ENERGY ABSORBER AND BRAKING DEVICE
Filed March 20, 1953  7 Sheets-Sheet 1

FIG. 1.

INVENTOR.
Robert R. Crookston,
BY
*J G McKean*
ATTORNEY.

Aug. 28, 1956  R. R. CROOKSTON  2,760,439
ENERGY ABSORBER AND BRAKING DEVICE
Filed March 20, 1953  7 Sheets-Sheet 2

FIG. 2.

INVENTOR.
Robert R. Crookston,
BY
J. G. McKean
ATTORNEY.

FIG. 3.

Aug. 28, 1956     R. R. CROOKSTON     2,760,439
ENERGY ABSORBER AND BRAKING DEVICE
Filed March 20, 1953     7 Sheets—Sheet 4

FIG. 4.

INVENTOR.
Robert R. Crookston,
BY
ATTORNEY.

FIG. 5.

Aug. 28, 1956 R. R. CROOKSTON 2,760,439
ENERGY ABSORBER AND BRAKING DEVICE
Filed March 20, 1953 7 Sheets-Sheet 6

INVENTOR.
Robert R. Crookston,
BY
ATTORNEY.

Aug. 28, 1956    R. R. CROOKSTON    2,760,439
ENERGY ABSORBER AND BRAKING DEVICE
Filed March 20, 1953    7 Sheets-Sheet 7

INVENTOR.
Robert R. Crookston,
BY
*J. G. McKean*
ATTORNEY.

United States Patent Office 2,760,439
Patented Aug. 28, 1956

2,760,439

ENERGY ABSORBER AND BRAKING DEVICE

Robert R. Crookston, Houston, Tex., assignor, by mesne assignments, to Esso Research and Engineering Company, Elizabeth, N. J., a corporation of Delaware Application March 20, 1953, Serial No. 343,763

6 Claims. (Cl. 103—159)

The present invention is directed to a device which may be used for applying a restraining or braking force to a rotatable shaft or which may be used for a pump.

The present invention is particularly adapted to be used as a braking device mounted on the shaft of a hoisting drum for controlling the rotation of the hoisting drum while lowering a load supported by a wire line wound on the drum.

In the drilling of a borehole by the rotary drilling method the drill must be lowered as it penetrates; this is accomplished by paying out the drilling line to lower the drill stem. It is desirable to pay out the drilling line smoothly and at such a rate that the weight carried by the drilling bit is substantially uniform as the drilling operation proceeds. Such conditions are desirable in order to insure a satisfactory rate of penetration of the drilling bit while maintaining a straight hole.

Also in making return trips of drill pipe into the hole during conventional drilling operations it is desirable to rotate the drum faster than during actual drilling.

It is also important not only to regulate the rotation of a hoisting drum at a uniform rate but also to be able to terminate the rotation of the drum at any desired time.

The device of the present invention allows the drilling line to be paid out smoothly and at a substantially uniform rate during the drilling operation and at a faster rate when making return trips of drill pipe into the hole and also capable of terminating the rotation of the drum at any desired time. The device of the present invention also allows an operator to control the rotation of a hoisting drum with a minimum of effort.

The device of the present invention may also be utilized as a pump, if desired.

Other advantages of the device of the present invention may be seen from the following description taken in conjunction with the drawings, in which.

Turning now to the drawings and first to the preferred embodiment shown in Figs. 1 through 8, the combination is composed of the following principle units, namely, a frame assembly A, a rotatable shaft B defining a crank pin C, a rotatable hub member D, rotatable link members E and E' and pivoting cylinder housing assemblies F, G, H, J, K, L, and M.

Figure 8:
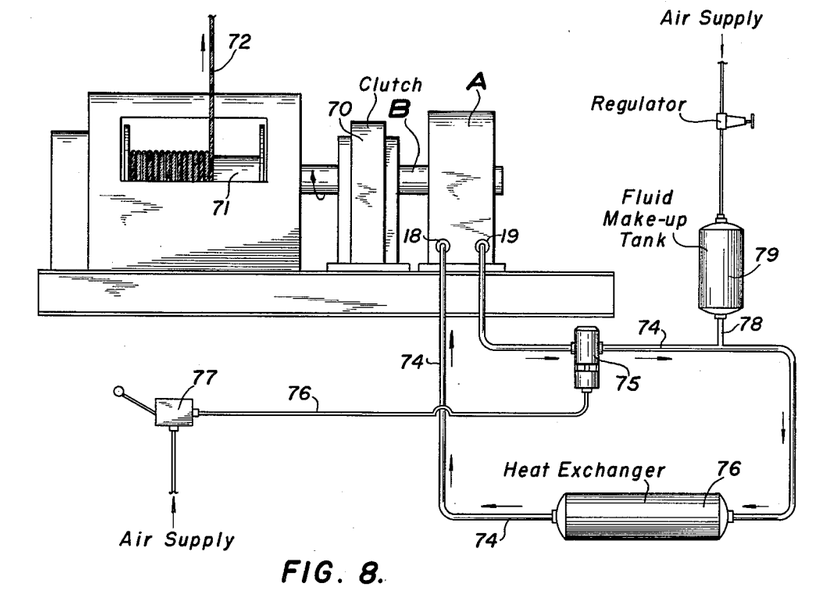
Fig. 8 is a diagrammatic showing of the device of the present invention connected to the drum shaft of the hoisting drum of a rotary drilling draw works and also a system connected thereto for controlling the operation of same.

An arrangement of the device of the present invention in a fluid system is shown in Fig. 8. Frame assembly A has flange connections 19 and 18 which serve as outlets and inlets, respectively, and are connected by line 74 in which is arranged heat exchanger 76 and valve 75.

Figure 1:
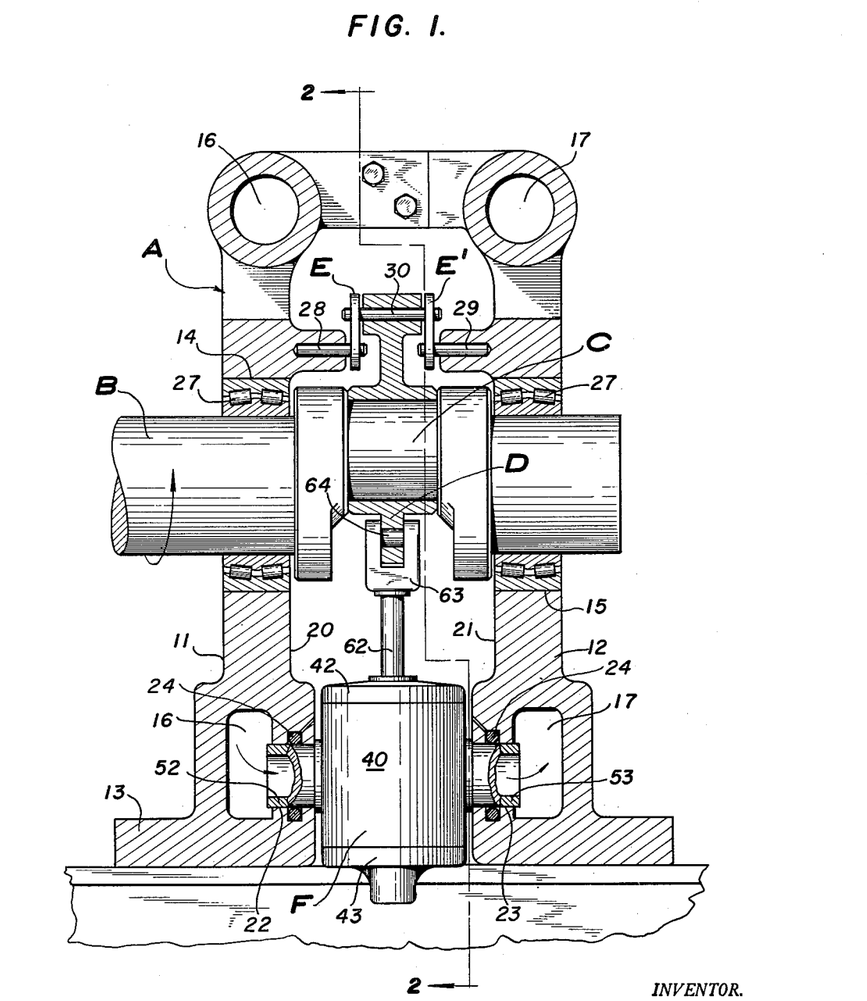
Fig. 1 is a cross-sectional view of the device of the present invention.
Figure 2:
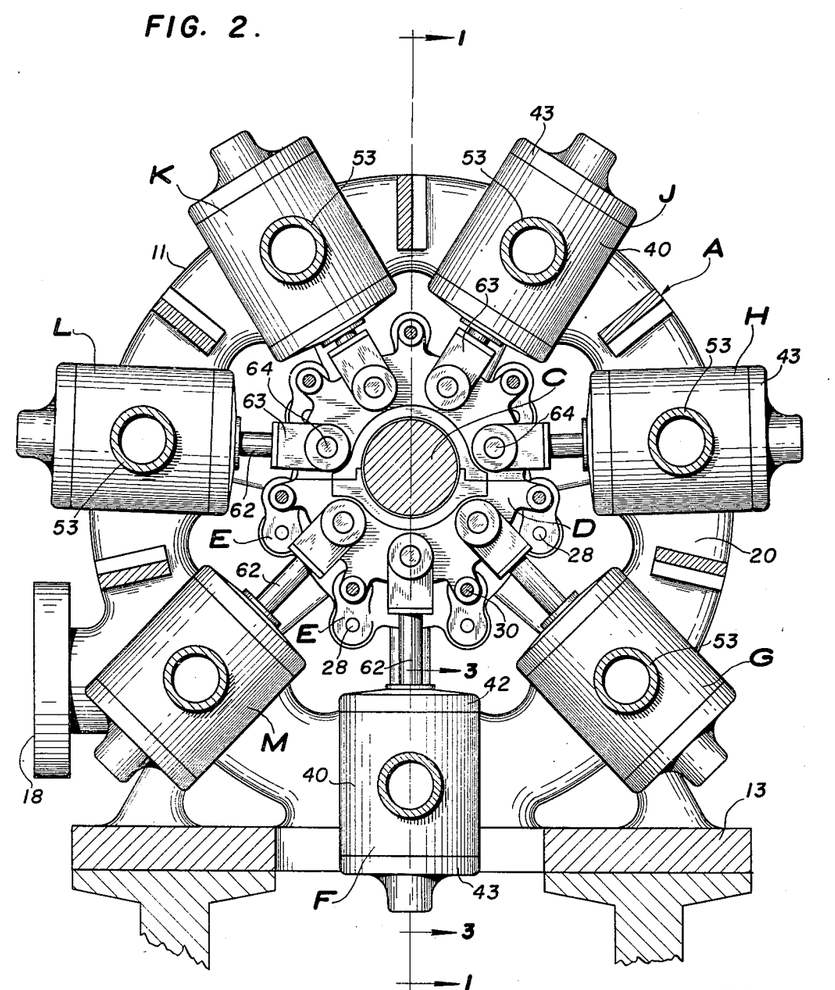
Fig. 2 is a sectional view taken along the line 2—2 of Fig. 1.
Figure 6:
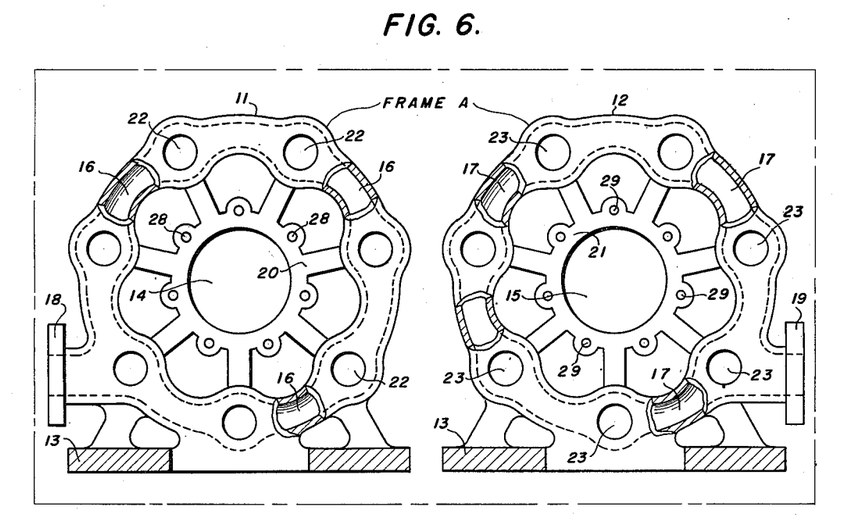
Fig. 6 is a view of the two frame members of the frame assembly, separated and laid side by side to show in more detail their construction.

Turning now particularly to Figs. 1, 2, and 6, frame assembly A is composed of two spaced plate members 11 and 12 each of which have a surface 13 which serve as a base for the frame assembly. Plate members 11 and 12 define concentrically spaced openings 14 and 15, respectively, therein for the purpose of rotatably mounting the shaft B. Plate members 11 and 12 also define annularly extending passageways 16 and 17, respectively, for the purpose of transmitting a fluid. Plate member 11 has a flange connection 18 as shown in Figs. 2, 6 and 8 attached to its outer periphery and fluidly communicating with passageway 16. It will be understood that flange connection 19 shown in Figs. 6 and 8 similarly communicates with passageway 17 of plate member 12.

The inner opposing surfaces 20 and 21 of plate members 11 and 12 each define a series of boreholes 22 and 23, respectively. The boreholes 22 in plate member 11 are radially arranged in respect to opening 14 and communicate with passageway 16. The boreholes 23 of plate member 12 are radially arranged in respect to opening 15 and communicate with passageway 17. Each of the boreholes 22 of plate member 11 is concentrically spaced apart from a corresponding borehole 23 of plate member 12. The boreholes 22 and 23 of plate members 11 and 12 each have their walls grooved for receiving a sealing means 24 for sealing around a trunnion which will herein later be described.

Concentrically fixed in a circle about and near the opening 14 and projecting from the inner surface 20 of plate member 11 are pivot pins 28. Also identically fixed in a circle about the opening 15 of inner surface 21 of plate member 12 and projecting therefrom are pivot pins 29. Each pivot pin 28 of plate member 11 is concentrically spaced apart from a corresponding pivot pin 29 in plate member 12. The function of these pins will herein later be described.

Shaft B is rotatably mounted in openings 14 and 15 of frame A by bearings 27. Defined by shaft B and positioned between plate members 11 and 12 is a crank pin C for rotation in an annular path about the axis of shaft B.

Rotatably mounted on crank pin C is a hub member D. Radially arranged about the outer periphery of hub member D in respect to its axis are pivot pins 30. Pivot pins 30 extend through and project from both sides of hub member D and are parallel to the axis of hub member D.

Pivotally attached by one end thereof to the ends of pins 30 on one side of hub member D are link members E. The other ends of link members E are each pivotally attached to pivot pins 28 projecting from plate member 11. Similarly attached to the other ends of pins 30 by one end thereof are link members E'. The other ends of links E' are each pivotally attached to the corresponding pivot pins 29 projecting from the inner surface 21 of plate member 12.

Ling members E and E' are arranged so as to allow rotation thereof in a circular path about the pivot pins 28 and 29. The throw of individual links E and E' is the same as the throw of crank pin C so as to retain hub member D in a fixed position in relation to its own axis but permitting movement in an annular path about the axis of shaft B as defined by crank pin C. It is necessary to have at least two link members in coordination with the crank pin to hold hub member D to a fixed path of rotation although a larger number may be used. This will be more clearly seen by referring to Fig. 7.

Arranged in a circle concentric to the axis of shaft B and pivotally mounted to and between plate members 11 and 12 are cylinder housing assemblies F, G, H, J, K, L, and M. The cylinder housing assemblies each being identical to one another, like parts will be given like numbers and only one will be described in detail.

Taking specifically assembly F, as shown in Figs. 1 through 5, this assembly is composed of a housing 40, of a generally cylindrical shape, having concentrically spaced therein a cylindrical partition 41. Housing 40 and cylindrical partition 41 are closed at their upper ends by a head plate 42 and at their lower ends by a closure plate 43. Cylindrical partition 41 is connected at its upper end to the inner wall of housing 40 by an annular partition 44 and also at its lower end by an annular partition 45. Head plate 42 and partition 44 define an annular chamber 46 between the inner wall of housing 40 and the outer wall of cylindrical partition 41.

Figure 3:
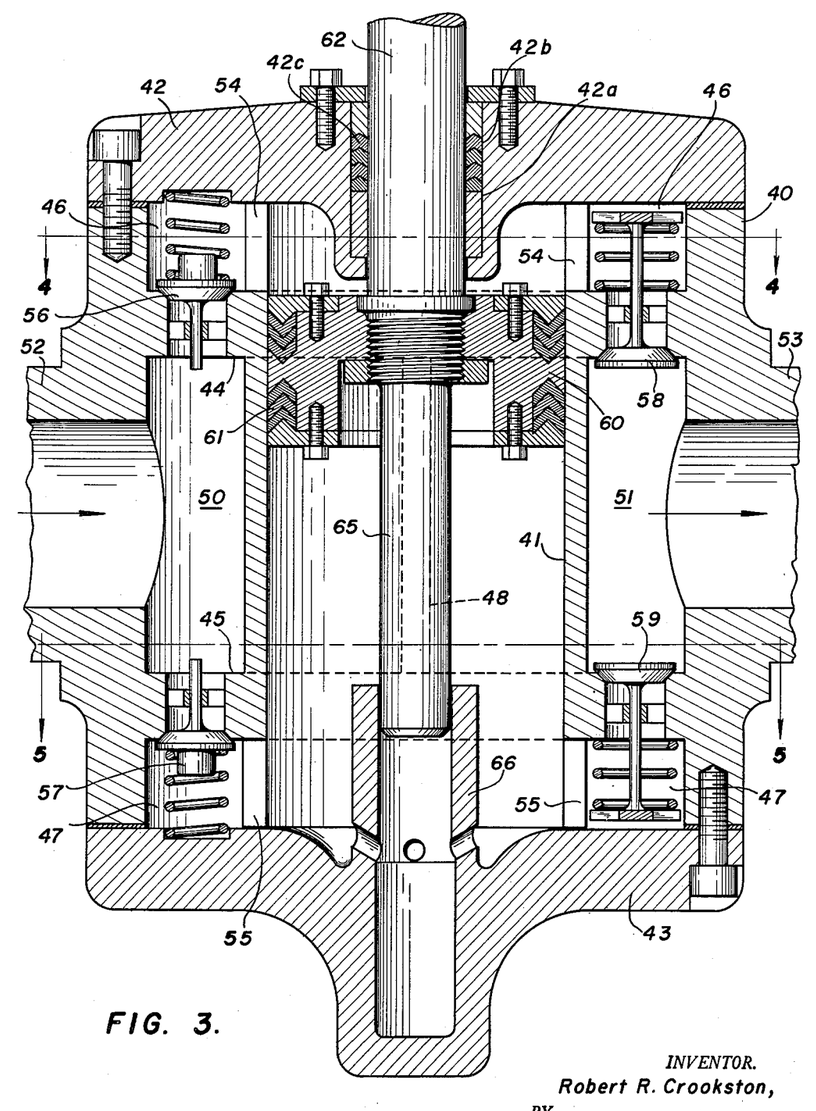
Fig. 3 is a sectional view taken along the line 3—3 of Fig. 2.
Figure 4:
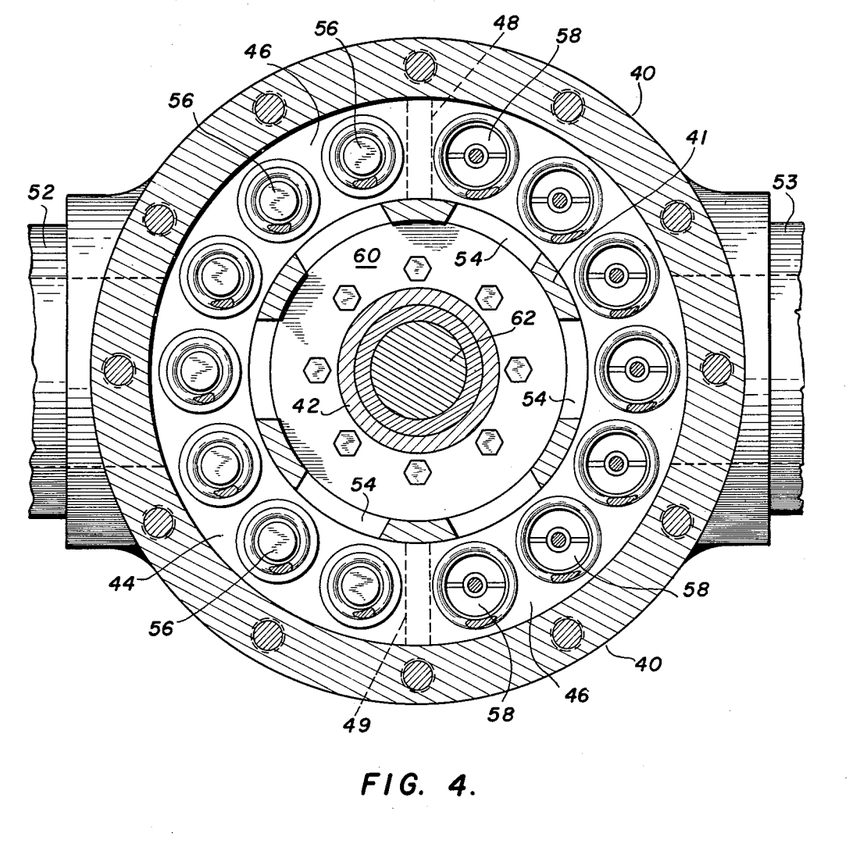
Fig. 4 is a sectional view taken along the line 4—4 of Fig. 3.
Figure 5:
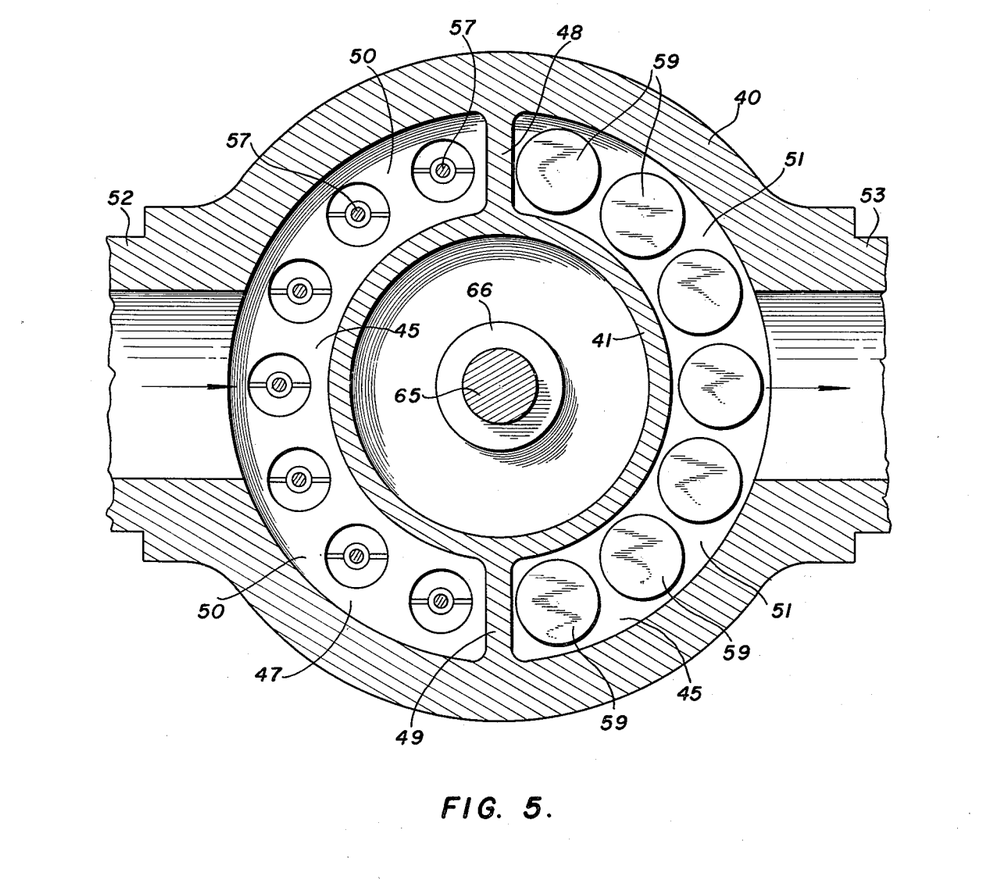
Fig. 5 is a sectional view taken along the line 5—5 of Fig. 3.

Closure plate 43 and partition 45 define an annular chamber 47 between the inner wall of housing 40 and the outer wall of cylindrical partition 41. The annulus defined by housing 40 and cylindrical partition 41 between partitions 44 and 45 is divided into two separate and equal size chambers by two longitudinally extending walls 48 and 49 spaced 180 degrees from each other. One chamber is to be designated as intake chamber 50 and the other is to be designated as the discharge chamber 51.

A pair of externally projecting hollow trunnions 52 and 53 are concentrically spaced on opposite sides of housing 40 and are perpendicular to the longitudinal axis thereof. Hollow trunnion 52 fluidly communicates with intake chamber 50 and hollow trunnion 53 fluidly communicates with discharge chamber 51.

Cylindrical partition 41 defines ports 54 and 55 communicating the interior of cylindrical chamber 41 with chambers 46 and 47, respectively.

Arranged in partition 44 adjacent chamber 50 is a series of spring-biased intake valve assemblies 56. Also arranged in partition 45 adjacent chamber 50 is a series of spring-biased intake valve assemblies 57.

Valve assemblies 56 operably communicate chamber 46 with intake chamber 50 and valve assemblies 57 operably communicate chamber 47 with intake chamber 50.

Arranged in partition 44 adjacent chamber 51 is a series of spring-biased discharge valve assemblies 58 and also arranged in partition 45 adjacent chamber 51 is a series of spring-biased discharge valve assemblies 59. Valve assemblies 58 operably communicate chamber 46 with discharge chamber 51 and valve assemblies 59 operably communicate chamber 47 with discharge chamber 51.

Slidably arranged within the cylindrical partition 41 for reciprocation between ports 54 and 55 is a piston 60 carrying on its outer periphery sealing means 61.

A piston rod 62 is attached to the upper side of piston 60 and extends through the opening 42a and packing gland 42b in cylinder head plate 42. Packing gland 42b has disposed therein sealing means such as chevron packing 42c for fluidly sealing around piston rod 62.

A piston guide rod 65 is attached to the lower side of piston 60 and slidably extends into a guide sleeve 66 defined by closure plate 43.

As shown by Figs. 1 and 2 the cylinder housing assemblies F to M are pivotally mounted between plate members 11 and 12 of frame A by insertion of hollow trunnions 52 and 53 in boreholes 22 and 23, respectively. The cylinder housing assemblies are operably connected by means of clevice 63 and pivot pins 64 of piston rod 62 to hub member D mounted on crank pin C.

Referring now to Fig. 8, along with Figs. 1 through 7, the device of the present invention designated generally as A is connected to the drum shaft of a draw works of a rotary drilling rig or unit.

The device A is mounted on shaft B which is connected through clutch assembly 70 to the shaft of a hoisting drum 71. Clutch or torque assembly 70 is conventional and familiar to the art so will not be described in detail. Drum 71 has wound thereon a wire line 72 which is supporting a load such as a string of drill pipe, not shown.

It is to be understood that the clutch assembly 70 only allows shaft B to be engaged with the shaft of the drum 71 while the wire line 72 is being unwound from the drum or when the line is stationarily supporting the string of drill pipe.

Flange connection 18 is connected to flange connection 19 by way of conduit 74. This conduit provides a closed circuit of the system.

Arranged in conduit 74 is an air-operated control valve 75. The housing of valve 75 contains a spring which tends to bias the valve in an open position.

A conduit 76 connects the housing of valve 75 to the outlet of the manually operated brake control valve 77 which has its inlet connected to a source of air supply, not shown. Brake control valve 77 is of the exhaust type so as to bleed air pressure from line 76 as desired.

Also connected to conduit 74 by conduit 78 is a pressure-operated fluid make-up tank 79.

Arranged in line 74 between conduit 78 and inlet connection 18 is a heat exchanger 76.

The entire system as illustrated and described is filled with a non-compressible fluid such as hydraulic fluid and is then ready for operation.

Referring now to Fig. 8, valve 75 is in the open position, thus allowing the hydraulic fluid to circulate through the system in the direction indicated by arrows.

As line 72 is unwound from the drum, shaft B is rotated, thereby rotating crank pin C. Movement of crank pin C and hub member D causes reciprocating movement of piston 60 in cylinder 41 of housing 40 and thereby a pumping action is exerted against the fluid contained in the system.

Figure 7:
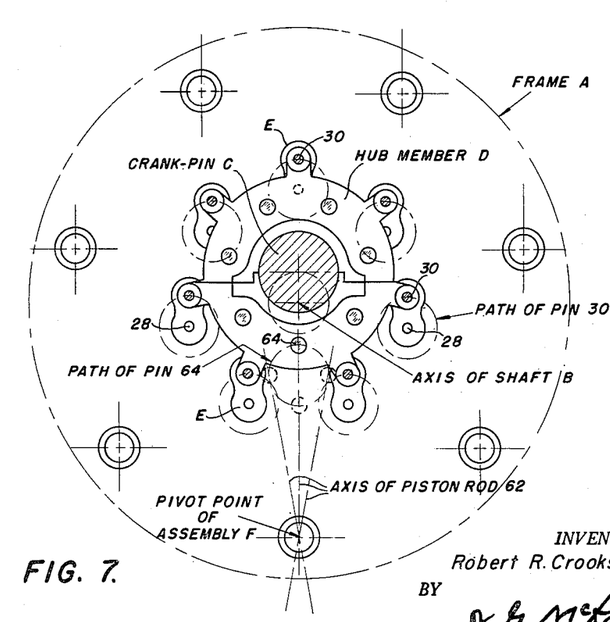
Fig. 7 is a schematic showing of the reciprocating action of various parts of the present invention.

Referring now to Figs. 1, 3 and 7 and assuming valve 75 is open, therefore allowing rotation of shaft B, it will be seen that piston 60 shown in Fig. 3 is at the top of its upward stroke and is about to be biased downwardly.

As piston 60 moves down fluid is drawn into the upper end of cylinder 41 by way of conduit 74, flange connection 18, passageway 16, hollow trunnions 52, intake chambers 50, intake valves 56, chamber 46, and the upper ports 54.

As the above described action is taking place the fluid within cylindrical partition cylinder 41 below piston 60 is forced outwardly through ports 55 in the lower end of cylindrical partition 41, into chamber 47, where it then is passed through discharge valve assemblies 59 to discharge chambers 51, hollow trunnions 53, passageway 17, outlet or connection 19, and then again into conduit 74.

As piston 60 moves down, intake valves 56 and discharge valves 59 are open and intake valves 57 and discharge valves 58 are closed.

As piston 60 moves up the effect is the same except that the intake and discharge valve positions are reversed.

As the fluid is passed through the system, the friction encountered and energy absorbed tend to heat the fluid and it is desirable to cool the fluid before it is again cycled through the system. For this reason the heat exchanger 76 is installed in the line 74 as shown.

The speed of rotation of drum 71 and feed-off of line 72 from the drum depends upon the rate the fluid is allowed to flow through the system. This rate of flow of fluid is entirely controlled by the opening and closing of valve 75 by operation of brake control valve 77 by the operator.

Figure 9:
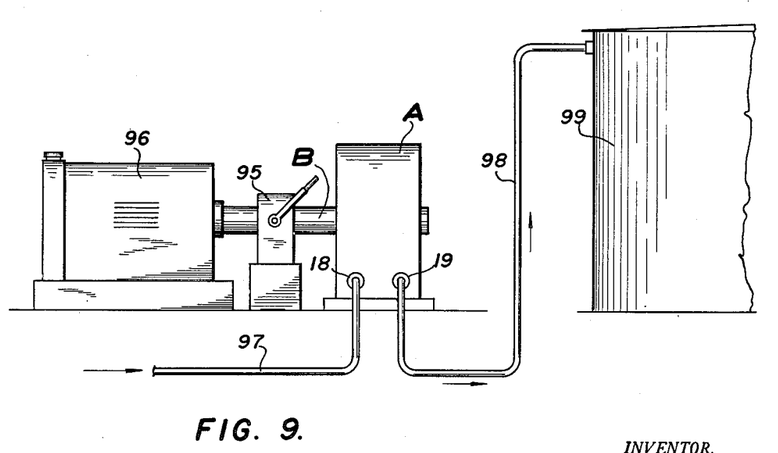
Fig. 9 is a diagrammatic figure showing how the device of the present invention can be used for a pump.

Referring now to Fig. 9, the device designated as A is connected by means of a clutch assembly 95 to the drive shaft of a prime mover such as a gasoline engine 96. A conduit 97 carrying fluid from a source not shown is connected to flange connection 18 of assembly A. Flange connection 19 of assembly A has connected thereto a conduit 98 which in turn is connected to a storage tank 99.

Rotation of shaft B by prime mover 96 causes the fluid in line 97 to be drawn in through connection 18, out through connection 19 and into line 98 and then into storage tank 99.

The device thus illustrated in Fig. 9 is solely for the purpose of transmitting fluids and the passage of fluid through assembly A is the same as previously described in Figs. 1 through 8 so will not be described for this embodiment.

The device of the present invention having been fully described and illustrated, what I claim as new and useful and desire to procure by Letters Patent is:

1. An apparatus comprising, in combination, a frame having an opening for receiving a shaft, said frame defining a first series and a second series of journal recesses facing one another and spaced about the axis of said opening, each journal recess of the first series being concentric with and facing a corresponding journal recess of the second series, the recesses of each series having their axes parallel to the axis of said opening and radially arranged with respect to the opening, said frame assembly defining a first and second spaced apart annular passageway concentric with the axis of said opening, said frame defining a connectible opening communicating with said first annularly extending passageway and also defining a connectible opening communicating with said second annularly extending passageway, said first annular passageway communicating with said recess of said first series of journal recesses and a second annularly extending passageway communicating with each journal recess of the second series of journal recesses, a sealing means arranged in each journal recess of said first and second series of journal recesses for fluidly sealing around and receiving a trunnion, a rotatable shaft mounted in said opening, said shaft defining a crank pin positioned between said first and second series of journal recesses for rotation in an annular path about the axis of said shaft, a hub member rotatably mounted on said crank pin, a plurality of radially spaced apart link members, each of said link members having one end pivotally attached to said hub member and the other end pivotally attached to said frame, a plurality of cylinder housing assemblies mounted in annular series about said opening, each of said cylinder housing assemblies comprising a housing provided with a pair of externally projecting concentric hollow trunnions fluidly communicating with the interior of said housing, said housing having an opening at one end thereof, a sealing means arranged in said opening, a pressure resposive means arranged in said housing, a rod having one end attached to said pressure responsive means and the other end extending through said opening in said end of said housing, said rod making a fluid tight seal with said sealing means in said opening and operably connecting to said hub member, each of said housing assemblies having one of its hollow trunnions projecting into a journal recess of said first series of journal recesses in sealing relationship with the sealing means therein and its other hollow trunnion extending into a corresponding journal recess of the second series of journal recesses in sealing relationship with the sealing means therein whereby each chamber is in fluid communication by means of said hollow trunnions with said first and second annularly extending passageways.

2. An apparatus in accordance with claim 1 in which the pressure responsive means is a piston.

3. A device for applying a restraining force to a rotating shaft comprising, in combination, a frame, a shaft rotatably mounted in said frame, said shaft defining a crank pin for rotation in an annular path about the axis of said shaft, a hub member rotatably mounted on said crank pin, at least two link members each having one end thereof pivotally attached to said hub member and the other end pivotally attached to said frame, said link members retaining said hub member in a fixed position in relation to its own axis but permitting movement of said hub member in an annular path about the axis of said shaft, a plurality of assemblies radially arranged about the axis of said shaft on said frame, each of said assemblies comprising a housing, a piston cylinder arranged in said housing, said housing and said piston cylinder defining a first chamber and a second chamber between the inner wall of said housing and the outer wall of said piston cylinder, said housing defining a fluid inlet communicating with said first chamber and a fluid outlet communicating with said second chamber, a common fluid conduit collectively connecting all of the fluid inlets of said housings to the fluid outlets of said housings and means in said conduit for controlling the flow of fluid therethrough, a plurality of first inlet valves arranged adjacent the upper end of said first chamber fluidly communicating said first chamber with the upper end of said piston cylinder, a plurality of second inlet valves arranged adjacent the lower end of said first chamber fluidly communicating said first chamber with the lower end of said piston cylinder, a plurality of first outlet valves arranged adjacent the upper end of said second chamber fluidly communicating with the upper end of said piston cylinder, a plurality of second outlet valves arranged adjacent the lower end of said second chamber fluidly communicating said second chamber with the lower end of said piston cylinder, said housing defining an opening in one end thereof having an annular sealing means arranged therein, a piston slidably arranged in said piston cylinder to reciprocate between the upper end and lower end of said cylinder, a piston rod having one end attached to said piston and the other end extending through said opening in said housing and making a fluid tight seal with said annular sealing means, means pivotally mounting each assembly on said frame and means operably connecting the rod of each assembly to said hub member.

4. A device for applying a restraining force to a rotating shaft comprising, in combination, a frame having an opening for receiving a shaft, said frame defining a first series and a second series of journal recesses facing one another and spaced about the axis of said opening, each journal recess of the first series being concentric with and facing a corresponding journal recess of the second series, the recesses of each series having their axis parallel to the axis of said opening and radially arranged with respect to the opening, said frame assembly defining a first and second spaced apart annularly extending passageways concentric with the axis of said opening, said frame defining a connectible opening communicating with said first annularly extending passageway and also defining a connectible opening communicating with said second annularly extending passageway, said first annularly extending passageway communicating with said recess of said first series of journal recesses, and a second annularly extending passageway communicating with each journal recess of the second series of journal recesses, a sealing means arranged in each of said journal recesses of said first and second series of journal recesses for fluidly sealing around and receiving a trunnion, a rotatable shaft mounted in said opening, said shaft defining a crank pin positioned between said first and second series of journal recesses for rotation in an annular path about the axis of said shaft, a hub member rotatably mounted on said crank pin, a plurality of radially spaced apart link members, each of said link members having one end pivotally attached to said hub member and the other end pivotally attached to said frame, a plurality of cylinder housing assemblies mounted in annular series about said opening, each of said cylinder housing assemblies comprising a housing provided with a pair of externally projecting concentric hollow trunnions fluidly communicating with the interior of said housing, said housing having an opening at one end thereof, a sealing means arranged in said opening, a pressure responsive means arranged in said housing, a rod having one end attached to said pressure responsive means and the other end extending through said opening in said end of said housing, said rod making a fluid tight seal with said sealing means in said opening and operably connecting to said hub member, each of said cylinder housing assemblies having one of its hollow trunnions projecting into a journal recess of said first series of journal recesses in sealing relation with a sealing means therein and its other hollow trunnion extending into a corresponding journal recess of the second series of journal recesses in sealing relationship with the sealing means therein whereby each cylinder housing assembly is in fluid communication by means of said hollow trunnions with said first and second annularly extending passageways, a conduit fluidly connecting the connectible opening of said first annularly extending passageway to the connectible opening of said second annularly extending passageway and means arranged in said conduit to control the flow of fluid through said conduit.

5. A device in accordance with claim 4 in which the pressure responsive means is a piston.

6. A device for applying a restraining force to a rotatable shaft comprising, in combination, a frame having an opening for receiving a shaft, said frame defining a first series and a second series of journal recesses facing one another and spaced about the axis of said opening, each journal recess of the first series being concentric with and facing a corresponding journal recess of the second series, the recesses of each series having their axes parallel to the axis of said opening and radially arranged with respect to the opening, said assembly defining first and second spaced apart annularly extending passageways concentric with the axis of said opening, said frame defining a connectible opening communicating with said first annularly extending passageway and also defining a connectible opening communicating with said second annularly extending passageway, said first annularly extending passageway communicating with the recesses of said first seris of journal recesses and a second annularly extending passageway communicating with each journal recess of the second series of journal recesses, a sealing means arranged in each journal recess of said first and second series of journal recesses for fluidly sealing around and receiving a trunnion, a rotatable shaft mounted in said opening, said shaft defining a crank pin positioned between said first and said second series of journal recesses for rotation in an annular path about the axis of said shaft, a hub member rotatably mounted on said crank pin, a plurality of radially spaced apart link members, each of said link members having one end pivotally attached to said hub member and the other end pivotally attached to said frame, a plurality of assemblies mounted in annular series about said opening, each of said assemblies comprising a housing, a piston cylinder concentrically arranged in said housing, said housing and said piston cylinder defining a first chamber and a second chamber between the outer wall of said piston cylinder and the inner wall of said housing, said housing provided with a first externally projecting hollow trunnion positioned perpendicular to the axis of said housing and said piston cylinder, said first hollow trunnion defining an inlet to said housing for fluidly communicating with said first chamber, said housing provided with a second externally projecting hollow trunnion positioned on the opposite side of the housing from and concentric with said first externally projecting hollow trunnion defining an outlet to said housing for fluidly communicating with said second chamber, a plurality of first inlet valves arranged adjacent the upper end of said first chamber fluidly communicating said first chamber with the upper end of said piston cylinder, a plurality of second inlet valves arranged adjacent the lower end of said first chamber fluidly communicating said first chamber with the lower end of said piston cylinder, a plurality of first outlet valves arranged adjacent the upper end of said second chamber fluidly communicating said second chamber with the upper end of said piston cylinder, a plurality of second outlet valves arranged adjacent the lower end of said second chamber fluidly communicating said second chamber with the lower end of said piston cylinder, said housing having an opening in one end thereof, a sealing means arranged in said opening, a piston slidably arranged in said piston cylinder, said piston to reciprocate between the upper end and the lower end of said piston cylinder, a rod having one end attached to said piston and the other end extending through said opening in said housing in sealing relationship with said sealing means, said rod being operably connected to said hub member, each of said housings of said asssemblies having one of said hollow trunnions projecting into a journal recess of said first series of journal recesses in sealing relationship with the sealing means therein and its other said hollow trunnion extending into a corresponding journal recess of the second series of journal recesses in sealing relationship with the sealing means therein whereby the first annularly extending passageway is in fluid communication by means of said assemblies with the second annularly extending passageway, a conduit fluidly communicating the connectible opening of said first annularly extending passageway to the connectible opening of said second annularly extending passageway, means arranged in said conduit for controlling the flow of the fluid through said conduit.

References Cited in the file of this patent

UNITED STATES PATENTS

| 1,133,980 | Livingston | Mar. 30, 1915 |
| 1,914,141 | Lundin | June 13, 1933 |
| 2,151,402 | Burch | Mar. 21, 1939 |

FOREIGN PATENTS

| 818,200 | France | June 14, 1937 |